INVENTORS
MYRON J. CLOSE
JOHN V. VOLD
BY
Charles A. Black
ATTORNEY.

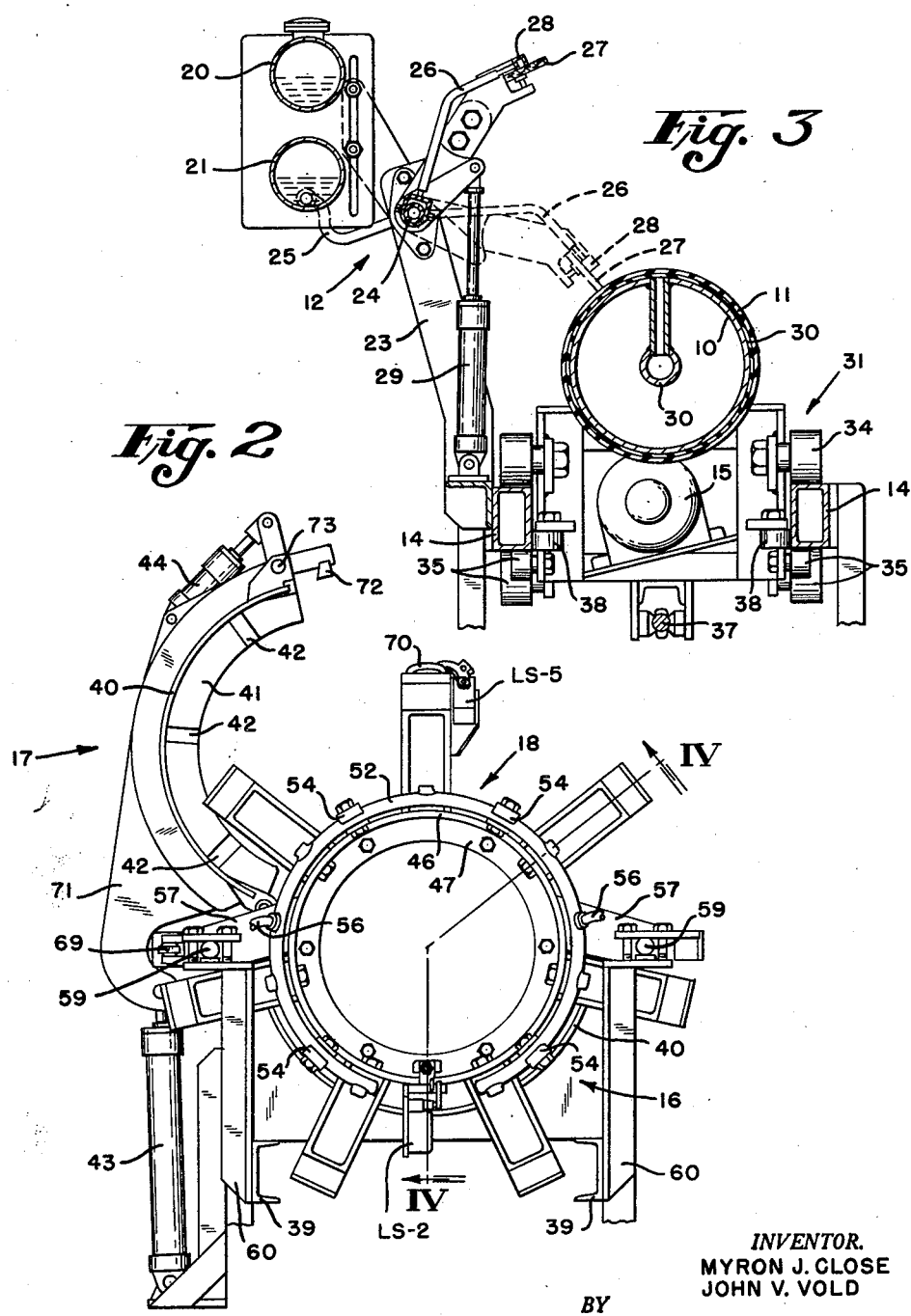

INVENTOR.
MYRON J. CLOSE
JOHN V. VOLD
BY
Charles A. Black
ATTORNEY.

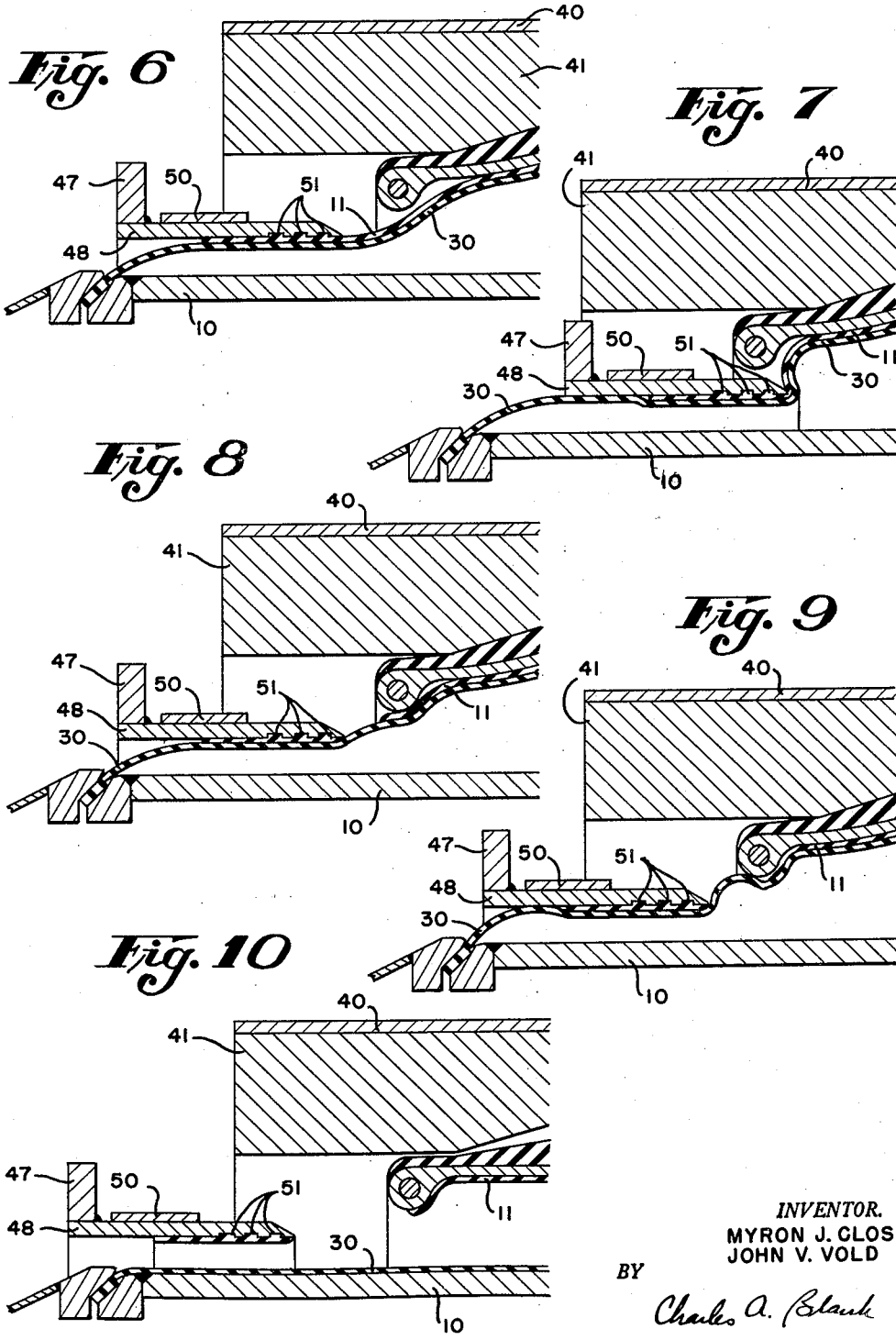

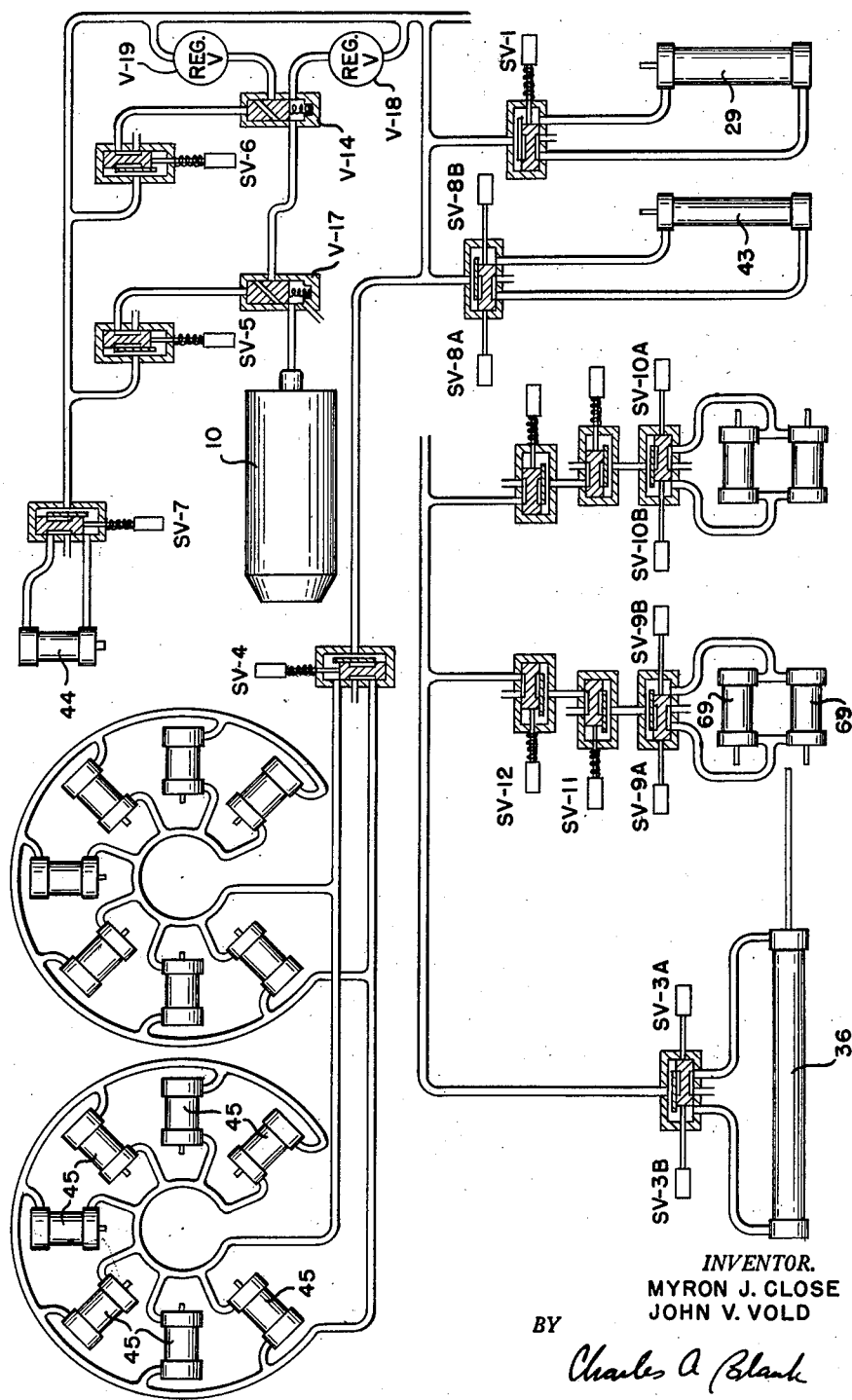

United States Patent Office 3,192,087
Patented June 29, 1965

---

3,192,087
SEMIAUTOMATIC LINER INSERTING MACHINE AND METHOD
Myron James Close and John Vincent Vold, Eau Claire, Wis., assignors to United States Rubber Company, New York, N.Y., a corporation of New Jersey
Filed Oct. 9, 1961, Ser. No. 143,796
4 Claims. (Cl. 156—126)

This invention relates to apparatus and methods of building tires and, more particularly, to apparatus and methods of applying an air-impervious liner to the carcass of a tubeless tire.

Prior tire building apparatus of the type described has been subject to the limitation that after the liner has been applied to the tire carcass, the excess liner extending over the outside of the tire carcass has generally required manual trimming. Further, the prior apparatus was not capable of piercing the tire carcass in the bead region to allow trapped air to escape during the application of the liner, and the piercing also had to be accomplished manually.

It is an object of the present invention, therefore, to provide a new and improved apparatus and method of applying an air-impervious liner to a carcass during the manufacture of tubeless tires.

It is another object of the invention to provide a new and improved apparatus for applying an air-impervious liner to a carcass during the manufacture of tubeless tires and for trimming excess liner from the carcass.

It is another object of the invention to provide a new and improved apparatus for piercing a carcass in the bead region thereof during the manufacture of tubeless tires.

In accordance with the invention, apparatus for applying a liner to a tire carcass comprises a drum over which the liner and the carcass are adapted to be placed with the carcass surrounding the liner, means spaced from the drum for supporting the carcass, and means including the drum for forcing the liner outwardly against the carcass to adhere the liner to the carcass, and means having an annular cutting edge movable over the liner to cut the excess portion of the liner.

For a better understanding of the present invention, together with other and further objects thereof, reference is made to the following description taken in connection with the accompanying drawings, and its scope will be pointed out in the appended claims.

Referring now to the drawings:

FIG. 2 is an enlarged end elevational view taken at the crib end of the apparatus of FIG. 1;

FIG. 3 is a sectional view taken on line III—III of FIG. 1;

FIGS. 6–10, inclusive, are enlarged fragmentary sectional views of trimming apparatus, partly diagrammatic to represent the operations of the apparatus.

FIG. 11 is a schematic diagram of the pneumatic control system.

Figure 1:
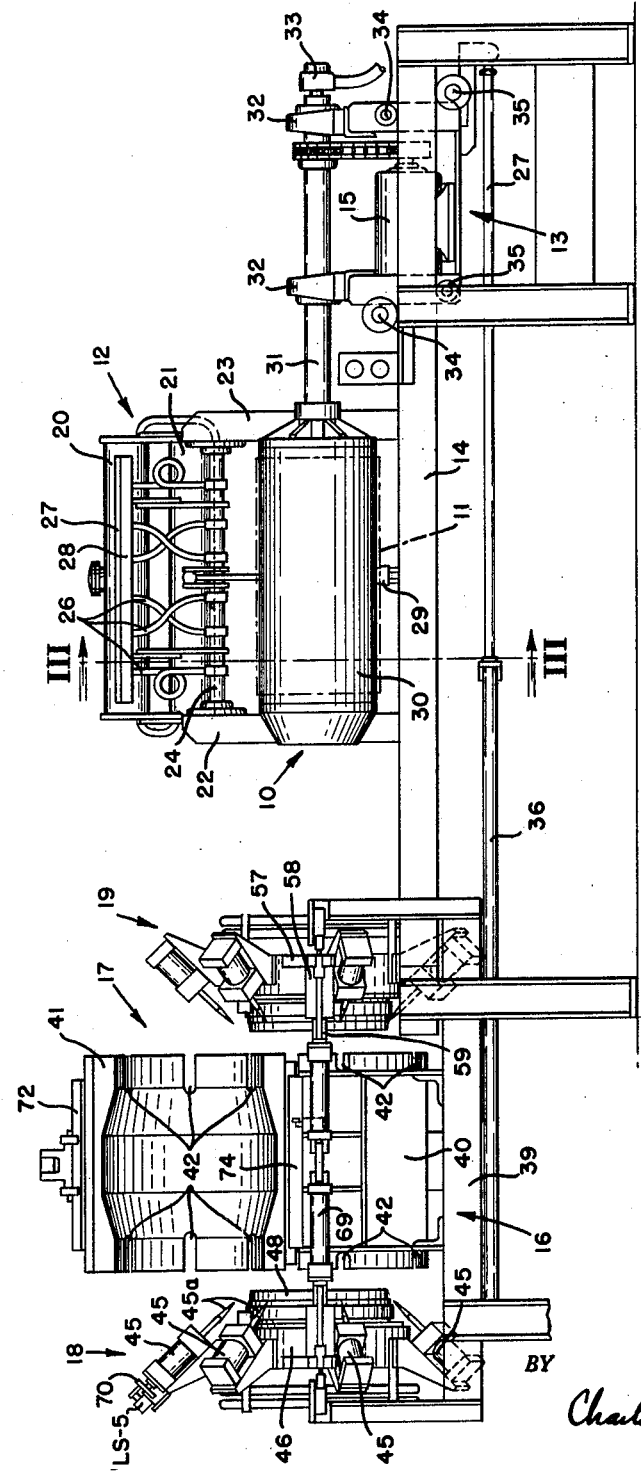
FIG. 1 is an elevational view representing tire building apparatus constructed in accordance with the invention.

Referring now more particularly to FIG. 1 of the drawings, there is represented apparatus constructed in accordance with the invention having an inflatable drum 10 over which a liner sleeve 11 may be placed for preparation with a solvent delivered by a device 12. A drum carriage 13 is mounted on a stationary framework 14. A motor 15 is mounted on the carriage 13 for rotating the drum 10 while the solvent is being applied.

The apparatus also includes means spaced radially from the drum for supporting the carcass. This means comprises a crib 16 having a cover 17. There are also provided means comprising piercing and trimming assemblies 18, 19 slidably mounted with respect to the carcass and having annular cutting edges for cutting the liner to remove the excess liner portion.

Referring now more particularly to FIGS. 1 and 3, the solvent applicator comprises a pair of cylindrical interconnected tanks 20 and 21 mounted on vertical supports 22 and 23 which are attached to framework 14. Tank 21 communicates with a hollow cross-shaft 24 by means of tubing 25. Tubes 26 form connections for fluid between the hollow cross-shaft 25 and felt applicator 27. A tube 28 distributes the solvent along the felt applicator 27. A pneumatic cylinder 29 actuates the solvent applicator to displace it from the full-lined position to the broken-line position represented in FIG. 3 so that the felt applicator 27 contacts the surface of the liner sleeve 11.

The inflatable drum 10, may be similar in construction to that described in Wikle et al. Patent 2,717,628 entitled "Tire Building Apparatus" and may utilize a single diaphragm.

The bladder 30 is sealed at the ends of the cylindrical surface of drum 10 which is mounted on the end of a hollow shaft 31 journaled in bearings 32 to allow rotation by motor 15. A rotary joint 33 is connected to an air supply for inflating the bladder 30. The carriage 13 and drum 10 are supported on rails 14 by means of upper wheels 34 and lower wheels 35 for movement relative to the crib 16 by a cylinder 36 having a rod end 37 attached to carriage 13. Inner wheels 38 aid in keeping the drum 10 in alignment with the crib 16.

Figures 4, 5:
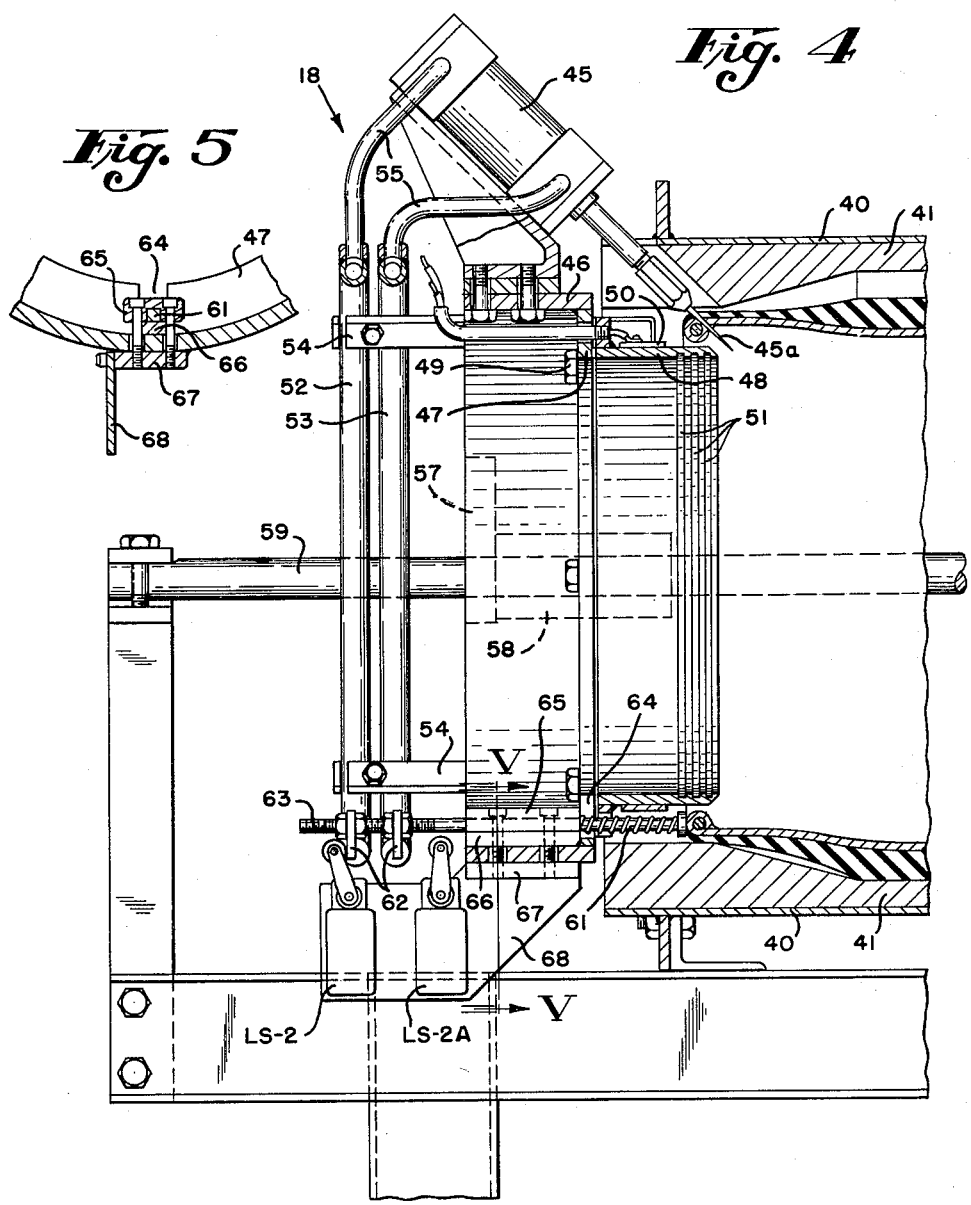
FIG. 4 is an enlarged sectional view taken on line IV—IV of FIG. 2, representing the carcass in a closed crib and needles piercing the bead portion.
FIG. 5 is a sectional view taken on line V—V of FIG. 4, showing a device for actuating limit switches.

Referring now more particularly to FIGS. 1, 2 and 4, assemblies 18 and 19 are located at the ends of the crib 16. The crib 16 and cover 17 are supported on longitudinal frame members 39 and combine to form a cylindrical inner shell 41 contoured approximately to the shape of the tire carcass. Slots 42 are provided at each end to permit perforation of the bead region of the tire carcass. A cylinder 43 is provided for closing the cover 17. A cylinder 44 (FIG. 2) is provided for locking and unlocking the cover 17.

The piercing and trimming assemblies 18, 19 are of similar construction. Assembly 18 is represented in FIGS. 1 and 4. Seven cylinders 45 having needles 45a are spaced around a mounting ring 46 which is, in turn, attached to ring 47 bolted to trimming ring 48.

The trimming ring 48 has a heating element 50 around its outer circumferential surface and has circumferential grooves 51 in the inner surface. Manifolds 52 and 53 are provided for distributing air to the cylinders 45 and are mounted on ring 46 by means of brackets 54. Flexible hose connectors 55 supply the air from the manifolds to the cylinders 45 and connectors 56 supply air from the source to the manifolds.

The mounting ring 46 has side extending members 57 and sleeve bearings 58 for mounting the assembly 18 on horizontal rods 59 which, in turn, are mounted on suitable supports 60 connected to longitudinal frame members 39.

A spring-loaded rod 61 to which cams 62 are attached at a threaded portion 63 moves through a slot 64 in the ring 47, thereby actuating limit switches LS2 and LS2A which control the movements of the ring in a manner to be described subsequently. The limit switches are mounted on a bracket plate 68 attached to a plate 67 bolted to blocks 65 and 66 through holes in the mounting ring 46. Shaft 61 slides in blocks 65 and 66 when actuated by the tire bead during the movement of the piercing and trimming assemblies 18, 19. The movement of the assemblies 18, 19 on horizontal rods 59 is actuated by a pair of cylinders 69 (FIG. 1) attached to each side of the crib 16. The rod ends of the cylinder 69 are connected to the side-extending members 57 (FIG. 4). Referring again to the piercing cylinders 45 represented in FIGS. 1 and 2, the uppermost cylinder is a double-ended cylinder having a disk 70 mounted on the end opposite to the piercing needle 45a. The disk 70 engages a curbed cam controlling a limit switch LS-5 which reverses the action of the cylinders 45, thereby retracting the needles 45a after the beads are perforated.

Referring to FIGS. 1 and 11 and considering now the operation of the apparatus, the liner may be prepared first by applying the solvent thereto or the carcass may be pierced first. All of the operations may be accomplished by an operator's controlling conventional push switches (not shown) which independently actuate the various solenoids represented in FIG. 11. Alternatively, a timer (not shown) of conventional construction having a multiple cam output can be utilized to control the independent energization of each of the relays for a timed period. Also, if desired, limit switches, control relays and circuits of conventional type can be utilized to cause the operations and energizations of the solenoids represented in FIG. 11 to occur sequentially in response to the termination of each preceding operation without requiring the use of a timer. For the sake of clarity, the operations will be described as being independently initiated by an operator.

When an operator places a carcass in the crib, he energizes solenoid valve SV8B to shift the solenoid valve from the position represented in the drawing and actuate cylinder 43. The rod end of cylinder 43 is connected to a plate attached to cover 17, causing the cover to pivot until properly enclosing the carcass in the crib 16. Upon actuation of solenoid SV7, locking bar 72 engages the crib locking bar 74.

The operator may then cause the application of solvent to the liner by causing the energization of solenoid SV1 which actuates cylinder 29 to apply the felt applicator 27 to the liner. During this period motor 15 can be caused to rotate by suitable energization for the purpose of rotating the liner.

While the liner is being prepared, the carcass may be pierced in the manner represented in FIG. 4. This may be accomplished by the energization of solenoid SV4 actuating the cylinders 45. Actuation of limit switch LS5 (FIG. 2) causes deenergization of solenoid valve SV4 returning the piercing needles to their rest position.

While the beads are pierced, the ring assembly 18 is moved into the position represented in FIG. 4 by the operator's energizing solenoid valves SV11, SV12 and SV9B. The assembly 18 is maintained at that position by the actuation of limit switch LS2 which causes deenergization of solenoid valve SV11. Switch contacts (not shown) in parallel with limit switch LS2 can be closed by the operator to allow the energization of solenoid valve SV11 after the piercing operations. At this time solenoid valve SV9A is energized and SV9B is deenergized to cause the ring assembly 18 to move to the position represented in FIG. 6. At that position limit switch LS2A is actuated, deenergizing solenoid valve SV12 and stopping the oil flow to cylinders 69.

With the drum in the position represented in FIG. 6, the drum 10 and liner 11 may be moved into the carcass by actuation of cyilnder 36 through energization of solenoid valve SV3A. Low pressure air is introduced into the liner through low-pressure regulator valve V18 to expand and press the liner partially against the inner wall of the carcass and the inner surface of the ring 48, as represented in FIG. 6. This is accomplished by energization of solenoid valve SV5, actuating control valve V17. After a suitable time delay switch contacts (not shown) in parallel with contacts LS2A may be closed to energize solenoid valve SV12 and solenoid valve SV9B is energized with solenoid valve SV9A deenergized to move the assembly 18 to the position represented in FIG. 7 to trim the liner.

With the assembly 18 in the position represented in FIG. 7 high pressure air is introduced into the drum 10 through regulator valve V19 by energization of solenoid valve SV6 which actuates valve V14. The high pressure air expands the bladder and liner as represented in FIG. 7 to force the soft liner stock against the heated edge and grooves 51 of the ring 48. After a short time delay, the high pressure air may be released or bled from the bladder and low pressure maintained while the ring 48 returns to the intermediate position with the severed excess liner retained in the ring 48 by the grooves 51, as represented in FIG. 8. With the ring 48 in the intermediate position, high pressure air may again be utilized to force the liner into place in the bead region, as represented in FIG. 9. The previously performed piercing operation releases any air that may be trapped in the recess beside the bead region. The ring 48 may then be returned to the extreme position represented in FIG. 10 for the removal of the carcass.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

Having thus described our invention, what we claim and desire to protect by Letters Patent is:

1. Apparatus for applying a liner to a tire carcass comprising an inflatable substantially cylindrical drum over which the liner and the carcass are adapted to be placed with the carcass surrounding the liner, means spaced radially from said drum for supporting the carcass, means including said drum for forcing the liner radially outwardly against the carcass to adhere the liner to the carcass, and means disposed adjacent an end of said drum and movable generally axially thereof and having an annular cutting edge movable over the liner to surround the liner, said drum being inflatable in the region of said cutting edge to force the liner against said cutting edge to cut the excess portion of the liner.

2. Apparatus for applying a liner to a tire carcass comprising an expansible drum over which the liner and the carcass are adapted to be placed with the carcass surrounding the liner, means spaced from the drum for supporting the carcass, and means including the drum for forcing the liner outwardly against the carcass to adhere the liner to the carcass, and means disposed adjacent an end of said drum and movable generaly axially thereof and comprising a heated ring movable over the liner to surround the liner, said ring having a cutting edge for cutting the excess portion of the liner upon expansion of said drum in the region of said cutting edge, said ring also having a grooved inner surface and said drum being effective to force said excess liner portion into said grooved surface for removal by said ring.

3. Apparatus for applying a liner to a tire carcass comprising an inflatable drum over which the liner and the carcass are adapted to be placed with the carcass surrounding the liner, means spaced from said drum for supporting the carcass, and means including said drum for forcing the liner outwardly against the carcass to adhere the liner to the carcass, a movable assembly mounted at each end of said carcass supporting means having a plurality of spaced needles for piercing the bead portion of the carcass, each assembly being movable generally axially of said drum and having an annular cutting edge movable over the liner to surround the liner, said drum being inflatable in the region of said cutting edge to force the liner against said cutting edge to cut the excess portion of the liner.

4. The method of applying a liner to a tire carcass comprising applying a liner over an inflatable drum, inflating the drum to press the liner against the inner wall of a tire carcass and against a cutting member to trim the excess portion of the liner and to adhere the excess portion of the liner to the cutting member, removing the cutting member with the excess portion of the liner adherent thereto, and further inflating the drum to press the liner against the bead portion of the tire carcass.

References Cited by the Examiner

UNITED STATES PATENTS

| | | | |
|---|---|---|---|
| 1,255,073 | 1/18 | Abbott | 156—399 |
| 1,433,971 | 10/22 | Roberts | 156—510 |
| 1,771,471 | 7/30 | Waner et al. | 83—176 |
| 2,517,889 | 8/50 | Kuffler | 156—126 |
| 2,561,012 | 7/51 | Clark | 83—156 |
| 2,871,912 | 2/59 | Kraft | 156—126 |
| 2,879,828 | 3/59 | Lancaster et al. | 156—394 |

FOREIGN PATENTS 536,438   1/57   Canada.

EARL M. BERGERT, *Primary Examiner.*

HAROLD ANSHER, *Examiner.*